United States Patent [19]

Sakai et al.

[11] 4,056,991
[45] Nov. 8, 1977

[54] HYDRAULIC CONTROL DEVICE FOR USE WITH AUTOMATIC SPEED CHANGE GEAR DEVICE

[75] Inventors: Toshimitsu Sakai; Kagenori Fukumura; Tadashi Saito, all of Toyota, Japan

[73] Assignee: Toyota Jidosha Kogyo Kabushiki Kaisha, Toyota, Japan

[21] Appl. No.: 585,605

[22] Filed: June 10, 1975

[30] Foreign Application Priority Data

Aug. 13, 1974 Japan .................................. 49-92005

[51] Int. Cl.² .................... B60K 41/04; B60K 41/10; F16D 25/11; F16K 31/363
[52] U.S. Cl. ........................................ 74/863; 74/867; 137/494; 137/503; 192/.075
[58] Field of Search ................. 74/863, 864, 865, 867, 74/868, 869, 752 C; 137/494, 503; 192/109 F, .075, .076

[56] References Cited

U.S. PATENT DOCUMENTS

| | | | |
|---|---|---|---|
| 2,767,726 | 10/1956 | Feucht | 137/494 X |
| 2,832,231 | 4/1958 | Edsall | 74/868 |
| 2,890,715 | 6/1959 | Ebersold | 137/494 |
| 3,101,011 | 8/1963 | Tuck | 74/752 C |
| 3,401,581 | 9/1968 | Chana | 74/752 C |
| 3,498,183 | 3/1970 | Risk | 137/503 X |
| 3,532,200 | 10/1970 | Chana | 192/109 F |
| 3,572,177 | 3/1971 | Ishihara | 192/109 F |
| 3,707,890 | 1/1973 | Ito | 74/868 |
| 3,752,009 | 8/1973 | Chana | 74/869 |
| 3,895,547 | 7/1975 | Murakami | 74/867 |

*Primary Examiner*—Samuel Scott
*Assistant Examiner*—Carl F. Pietruszka
*Attorney, Agent, or Firm*—Lane, Aitken, Dunner & Ziems

[57] ABSTRACT

A hydraulic control device for use with an automatic speed change gear device for a diesel engine using a torque convertor and an auxiliary speed change gear device. This hydraulic control device is provided with a back pressure control valve controlled by means of a throttle pressure developed in response to a throttle opening, wherein when the throttle opening is smaller than a given opening, a pressure oil having a pressure lower than a line pressure is introduced to an accumulator, and when the throttle opening is greater than the aforesaid given opening, a pressure oil having the same pressure level as that of said line pressure is fed to said accumulator to thereby obtain a desired engaging pressure for said automatic speed change gear device, thus effectively preventing a shock due to a change in speed. This device may also be used with a gasoline engine.

6 Claims, 15 Drawing Figures

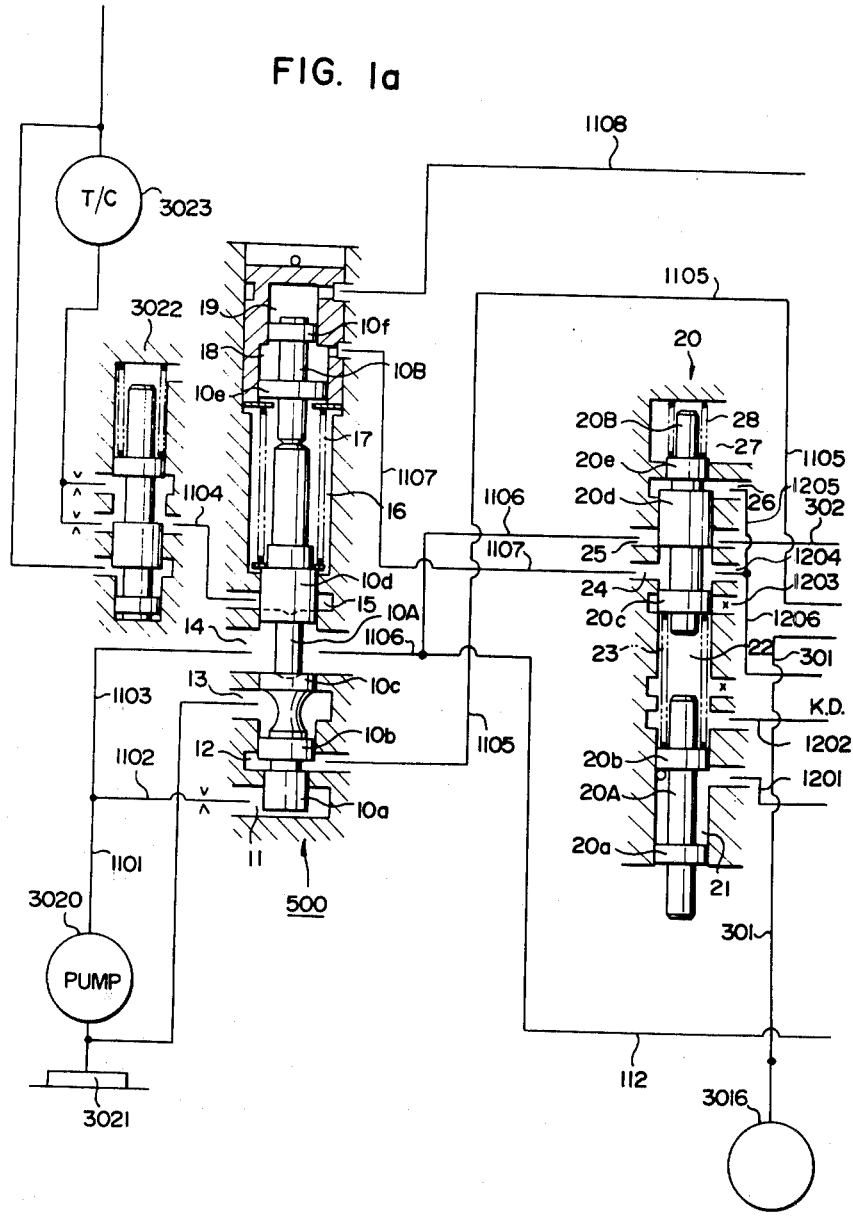

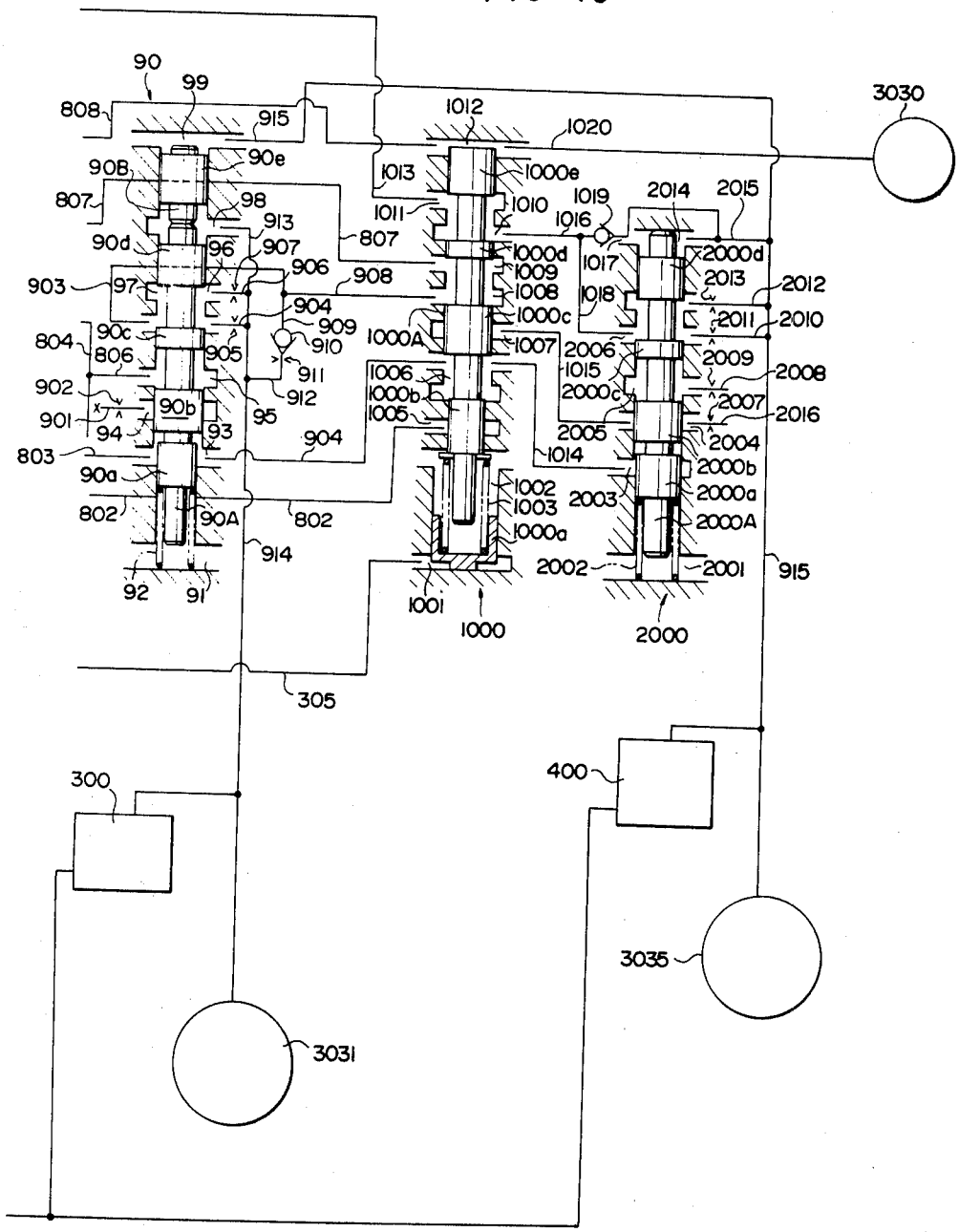

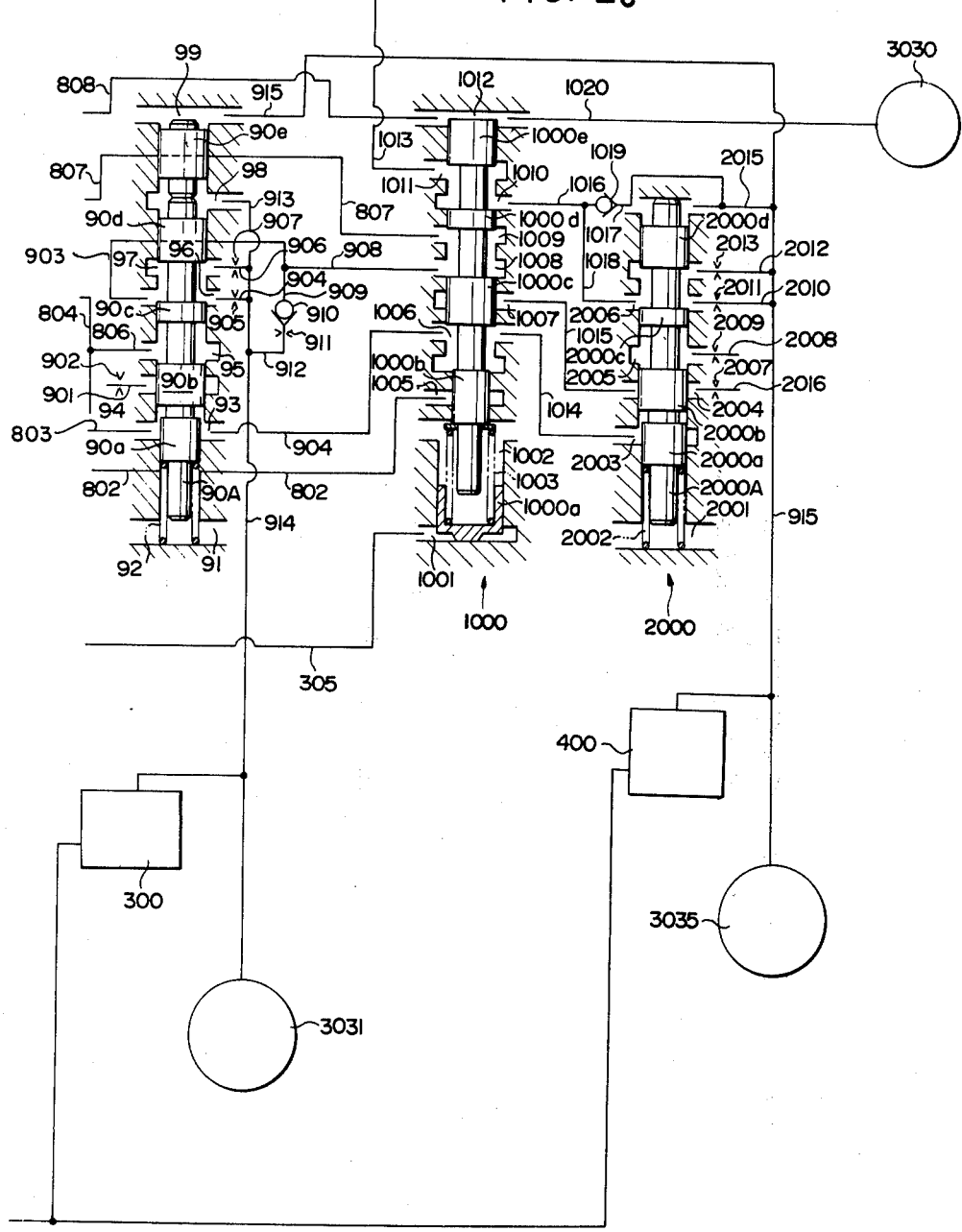

HYDRAULIC CONTROL DEVICE FOR USE WITH AUTOMATIC SPEED CHANGE GEAR DEVICE

BACKGROUND OF THE INVENTION

1. Field of the Invention

This invention relates to a hydraulic control device for use with an automatic speed change gear used in a diesel engine on a vehicle, which engine is provided with a torque converter and an auxiliary speed change gear device, and more particuarly to the control of a back-pressure for an accumulator for use with an automatic speed change gear device used in a diesel engine.

2. Description of the Prior Art

Hitherto, an automatic speed change gear device used with diesel engine suffers from disadvantage of an excessively great shock when changing a speed, as compared with a gasoline combined for use with an automatic speed change gear device. This is often attributable to the fact that a hydraulic control system for use with the automatic speed change device in a gasoline engine is applied to the diesel engine in fact, despite the different characteristics between the diesel engine and the gasoline engine.

FIG. 3 shows the typical relationship among the R.P.M., output torque and throttle openings, of an gasoline engine. In contrast to this, FIG. 4 shows similar characteristic curves of a diesel engine according to a pneumatic governor control system. (This will be referred to simply as a diesel engine, hereinafter). As is best shown in FIGS. 3 and 4, an almost constant maximum torque may be obtained irrespective of the extents of stepping on an accelerator pedal in the case of a diesel engine, whereas the maximum torque to be obtained will be greater with an increase in a throttle opening in the case of a gasoline engine. On the other hand, with the diesel engine, the greater the extent of stepping on an accelerator pedal, the higher will be the maximum R.P.M. However, with a gasoline engine, a considerably high R.P.M. results at a smaller extent of stepping on the accelerator pedal, and thus the maximum R.P.M. is not dependent on throttle openings. Furthermore, with a diesel engine, a substantially constaant torque may be obtained up to a certain R.P.M. at a given step angle of the accelerator pedal, while the torque will sharply drop when a certain R.P.M. is exceeded. In contrast thereto, with a gasoline engine, the torque will drop smoothly.

Meanwhile, there has been recently used an accumulator for reducing or moderating a shock due to an automatic speed change gear device, wherein a line pressure is directly used as a back pressure for the accumulator. As shown in FIG. 5, the line pressure will gradually increase with the increase in throttle opening. FIG. 6 illustrates the relationship between an engaging pressure required for engaging a friction member of an automatic speed change gear device in a gasoline engine, wherein the larger the throttle opening, the higher will be the engaging pressure, accordingly. As a result, if only the line pressure is directly used as a back pressure for an accumulator, a resulting shock may be effectively remedied. Nevertheless, in the case of an automatic speed change gear device for use in a diesel engine, there should be used an engaging hydraulic pressure as shown by the solid line in FIG. 7 due to the characteristics inherent to the diesel engine. As is best shown in FIG. 7, the engaging pressure required is maintained lower than the line pressure $P_L$ in the range of zero to $\theta_o$ of the throttle openings. If, however, the line pressure as shown by the broken line but within the above range is fed as a back pressure for an accumulator, then there will result a considerably great shock due to the change in speed. On the other hand, the use of an excessively high engaging pressure exerts adverse effects on a friction engaging member.

SUMMARY OF THE INVENTION

It is accordingly an object of the present invention to provide a hydraulic control device for use with an automatic speed change gear device for a diesel engine which provides a desired engaging pressure for automatic speed change gear device to thereby effectively prevent a shock caused due to a speed change.

It is a further object of the present invention to provide a hydraulic control device for use with an automatic speed change gear device for a diesel engine, which may be used in common with other gasoline engines and which may be produced as a unit at a low cost for common use for a diesel engine as well as a gasoline engine.

According to the present invention, these and other objects and features may be readily attained in a hydraulic control device for use with an automatic speed change gear device for a diesel engine using a torque convertor and an auxiliary speed change gear device, the aforesaid hydraulic control device having a back pressure control valve in a hydraulic circuit leading from a line pressure regulator valve to an accumulator for preventing a shock caused by a speed change, the line pressure for said back pressure control valve being controlled according to the opening of a throttle valve, said hydraulic control valve having a valve body and a piston, said valve body being provided with a line pressure inlet, a throttle-opening-signal-pressure-oil inlet, a pressure oil outlet and a back pressure port communicating with said pressure oil outlet, and said piston being shiftable and supported on one end by means of a spring within said valve body, whereby said piston is shiftable in response to the pressure of a throttle-opening-signal-pressure oil to change the degree of said line pressure oil inlet in communication with said pressure oil outlet, so that when an opening of said throttle valve is smaller than a given opening, the pressure oil lower in level than the line pressure is fed to said accumulator, and when said opening of said throttle valve is greater than said given opening, the pressure oil having the same pressure level as that of said line pressure is fed to said accumulator through said pressure oil outlet.

According to another aspect of a hydraulic control device for use with an automatic speed change gear device of the type specified, the aforesaid piston has first, second and third lands having different diameters, a throttle-valve-opening-signalpressure-oil inlet in said valve body being open to said first land, said line pressure oil inlet being open between said second and third lands; and the aforesaid spring supporting said piston is provided between said third land and one end of said valve body.

According to a further aspect of a hydraulic control device for use with an automatic speed change gear device of the type specified, wherein the aforesaid back pressure control valve, having detent pressure controlled according to openings of a throttle valve, is provided in a hydraulic circuit leading from a detent pressure regulator valve to an accumulator for preventing a shock caused by the speed change, said back pressure control valve having a valve body and a piston, said valve body connecting with a detent pressure oil inlet leading from said back pressure regulator valve, a throttle-opening-signalpressure-oil inlet leading from said throttle valve, a pressure oil outlet and a back pressure port communicating with said pressure oil outlet, and said piston being shiftable and supported on one end by means of a spring within said valve body, whereby said piston changes the communicating degree of said detent-pressure-oil inlet with said pressure oil outlet, so that thwn an opening of said throttle valve is smaller than a given opening, the pressure oil having a pressure lower than the detent pressure is fed to said accumulator through said pressure oil outlet, and when the opening of said throttle valve is larger than said given opening, a pressure oil having a constant pressure is fed to said accumulator through said pressure oil outlet.

According to a still further aspect of a hydraulic control device for use with an automatic speed change gear device of the type specified, a back pressure control valve has a detent pressure controlled according to a throttle opening and provided in a hydraulic circuit leading from a detent pressure regulator valve to an accumulator for preventing a shock caused by a speed change, the detent pressure for said back pressure control valve being controlled according to the opening of a throttle valve, said control valve having a valve body and a piston, said valve body connecting with a detent pressure oil inlet leading from a detent pressure regulator valve, a throttle opening signal pressure oil inlet leading from a throttle valve, a pressure oil outlet and a back pressure port communicating with said pressure oil outlet, said piston being shiftable and supported on one end by means of a spring within said valve body, said piston having a first, second and third lands having different diameters, the throttle valve opening signal pressure inlet of said valve body being open to the head of said first land, said detent pressure oil inlet being open between said second and third lands, and said spring supporting said piston being provided between said third land and one end of said valve body.

BRIEF DESCRIPTION OF THE DRAWINGS

FIGS. 1a to 1c are circuit diagrams of a hydraulic control device embodying the present invention;

DESCRIPTION OF THE PREFERRED EMBODIMENTS

With a hydraulic control device for use in a combination of a diesel engine with an automatic speed change gear device according to the present invention, an automatic speed control device used may be of a two speed or a three speed type. However, for illustration, an automatic speed change gear device of a four speed type is given as embodiments of the invention. Now, description will be given of the construction and functions of a gear train.

Construction of gear train

Figure 8:
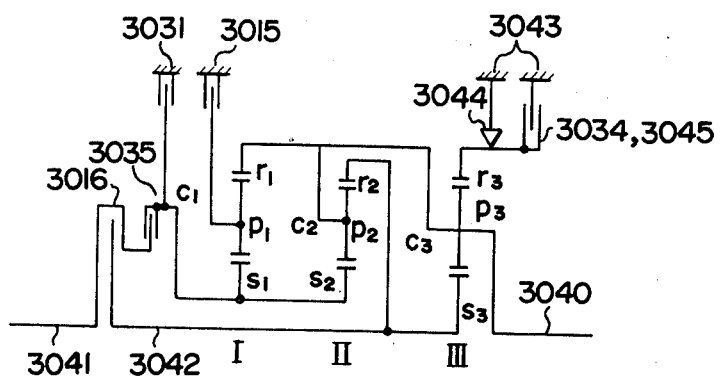
FIG. 8 is a diagram showing the outline of one example of a gear train, to which is applied a hydraulic control device according to the present invention.

FIG. 8 shows one example of a gear train, to which is applied a hydraulic control device according to the present invention. Table 1 shows the relationship between the engaging and releasing conditions of the respective portions of a gear train.

Table 1

|  | front clutch | rear clutch | second brake | third brake | first/reverse brake and the first piston | reverse piston |
|---|---|---|---|---|---|---|
| D-range, the first speed | O |  |  |  | O |  |
| the second speed | O | | O | | | |
| the third speed | O | | | O | | |
| the fourth speed | O | O | | | | |
| N-range | | | | | O | |
| R-range | | | O | | O | O |
| P-range | | | | | O | |

Mark O: engaged condition
No mark: released condition

As shown in FIG. 8, the gear train is provided with three sets of single type planetary gear mechanisms I,II,II. The respective sets of the mechanisms have sun gears $s1$, $s2$, $s3$; pinion gears $p1$, $p2$, $p3$; and ring gears $r1$, $r2$, $r3$. The sun gears $s3$ of the third single type planetary gear mechanism III is coupled to an input shaft 3041 through an intermediate shaft 3042 for a front clutch 3016. On the other hand, the sun gear $s3$ meshes with the pinion gear $p3$ which in turn meshes with the ring gear r3. Interposed between the ring gear $r3$ and a transmission case 3043 are a one-way clutch 3044, a first brake 3034 adapted to be engaged at the time of the first speed mode, and a reverse brake 3045 adapted to be engaged at the time of a rearward movement. A carrier $c3$ rotatably supporting the pinion gear $p3$ is coupled to the ring gear $r1$ of the first planetary gear mechanism I and to a carrier $c2$ of the second single type planetary gear mechanism II as well as to an output shaft 3040.

The ring gear $r2$ of the second planetary gear mechanism II is coupled the sun gear $s3$ of the third planetary gear mechanism III, while the ring gear $r2$ meshes with the pinion gear $p2$ which is rotatably supported by the carrier $c2$. The pinion gear $p2$ meshes with the sun gear $s2$ which in turn is coupled through a clutch 3035 to an input shaft 3041.

The sun gear $s1$ of the first planetary gear mechanism I is coupled to the sun gear $s2$ of the second planetary gear mechanism II and thus rotated integrally therewith. In the second speed mode, the carrier $c1$ is fixed by means of a second brake 3015, while the sum gears $s1$, $s2$ are fixed by means of a third brake 3031.

Action of gear train

In the case of a D-range and the first speed mode, a front clutch 3016 is engaged and thus a power of the input shaft 3041 is transmitted through an intermediate shaft 3042 to the sun gear $s3$ of the third planetary gear mechanism III. Since the ring gear $r3$ is not rotated due to the first brake 3034 being engaged, the carrier $c3$ is rotated at a reduced R.P.M. and its rotation in the first speed mode is taken out to an output shaft 3040

In the case of a D-range and the second speed mode, the carrier $c1$ is fixed due to the second brake 3015 being engaged, so that a power presenting a rotation reduced by means of the first planetary gear mechanism I is applied to the output shaft 3040, so the R.P.M. higher than that in the first speed mode is taken out to an output shaft 3040, this providing the second speed mode.

In the case of a D-range and the third speed mode, a third brake 3031 is engaged to thereby fix the sun gears $s1$, $s2$. The power presenting a rotation reduced by means of the second planetary gear mechanism II is applied to an output shaft 3040, so that the R.P.M higher than in the second speed mode is taken out to the output shaft 3040, thus providing the third speed mode.

In the case of the D-range and the fourth speed mode, both a front clutch 3016 and a rear clutch 3035 are engaged, so that the three planetary gear mechanisms I, II, III are rotated integrally. As a result, the rotation of an input shaft 3041 is transmitted to the output shaft 3040 without being decelerated.

In the N (neutral) range, the front clutch 3016 and the rear clutch 3035 are both disengaged, so that the rotation of the input shaft 3041 is not transmitted to the output shaft 3040.

In the R (rearward run) range, the rear clutch 3035 is engaged, so the rotation of the input shaft 3041 is transmitted to the sun gears $s1$, $s2$, while the rotation in the direction opposite to the rotating direction of the input shaft 3041 is transmitted to the sun gear $s3$ through the medium of the pinion gear $p2$ and ring gear $r2$. In addition, since reverse brake 3045 and first brake 3034 are engaged, the ring gear $r3$ is fixed, so that the rotation in the direction opposite to the direction of the carrier $c3$ may be obtained.

The speed change ratios in the respective speed modes are as follows:

The first speed mode $\dfrac{n_0}{n_1} = \dfrac{1}{1 + \dfrac{1}{\rho_3}}$

The second speed mode $\dfrac{n_0}{n_1} = \dfrac{1}{1 + \rho_2 + \dfrac{\rho_2}{\rho_1}}$ The third speed mode $\dfrac{n_0}{n_1} = \dfrac{1}{1 + \rho_2}$ The fourth speed mode $\dfrac{n_0}{n_1} = 1$ The rearward run $\dfrac{n_0}{n_1} = \dfrac{1}{\dfrac{1}{\rho_2 \rho_3} - 1}$ wherein $n_1$: R.P.M. of input shaft 3041
$n_0$: R.P.M. of output shaft 3040

Figure 1B:
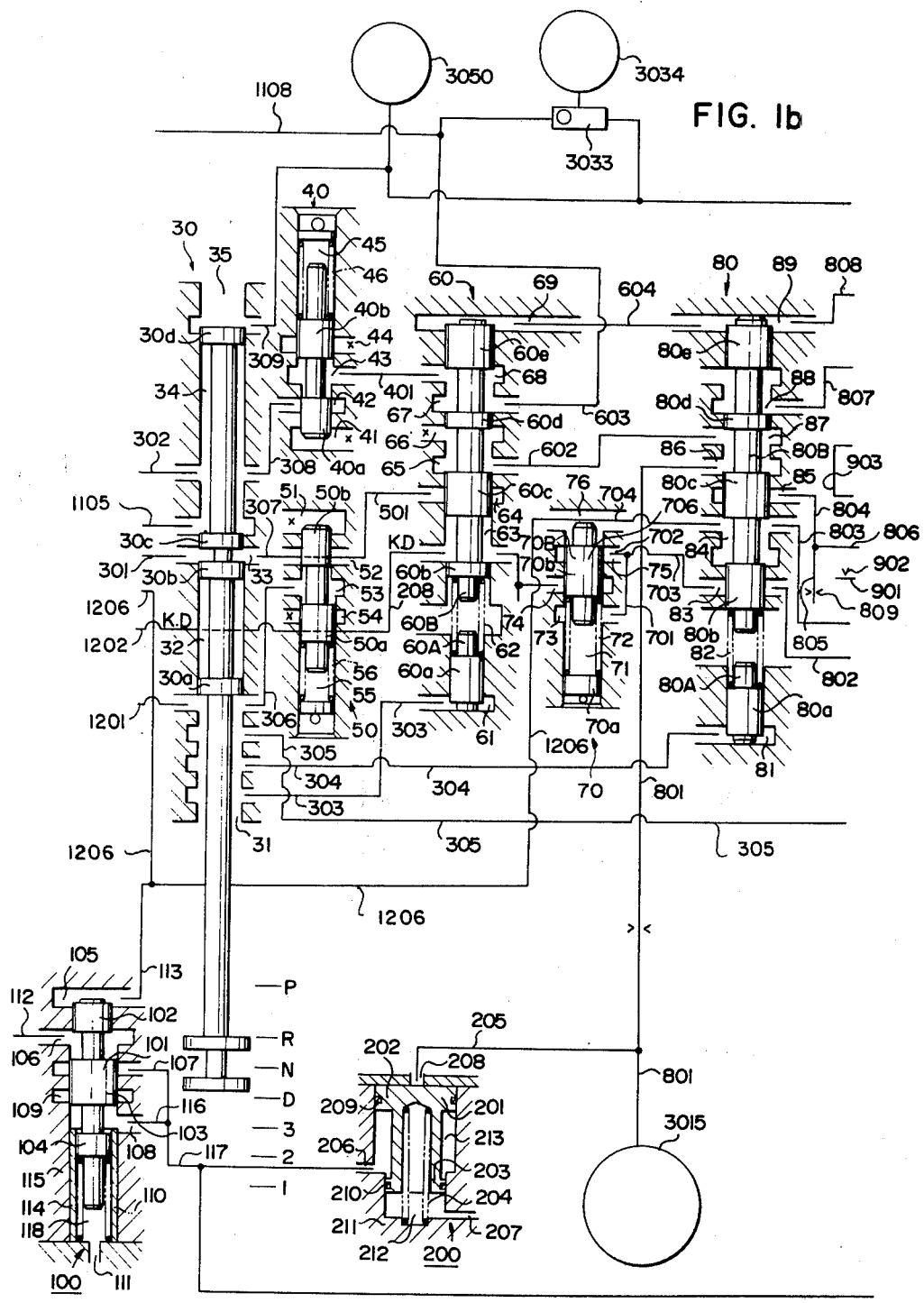
Figure 2A:
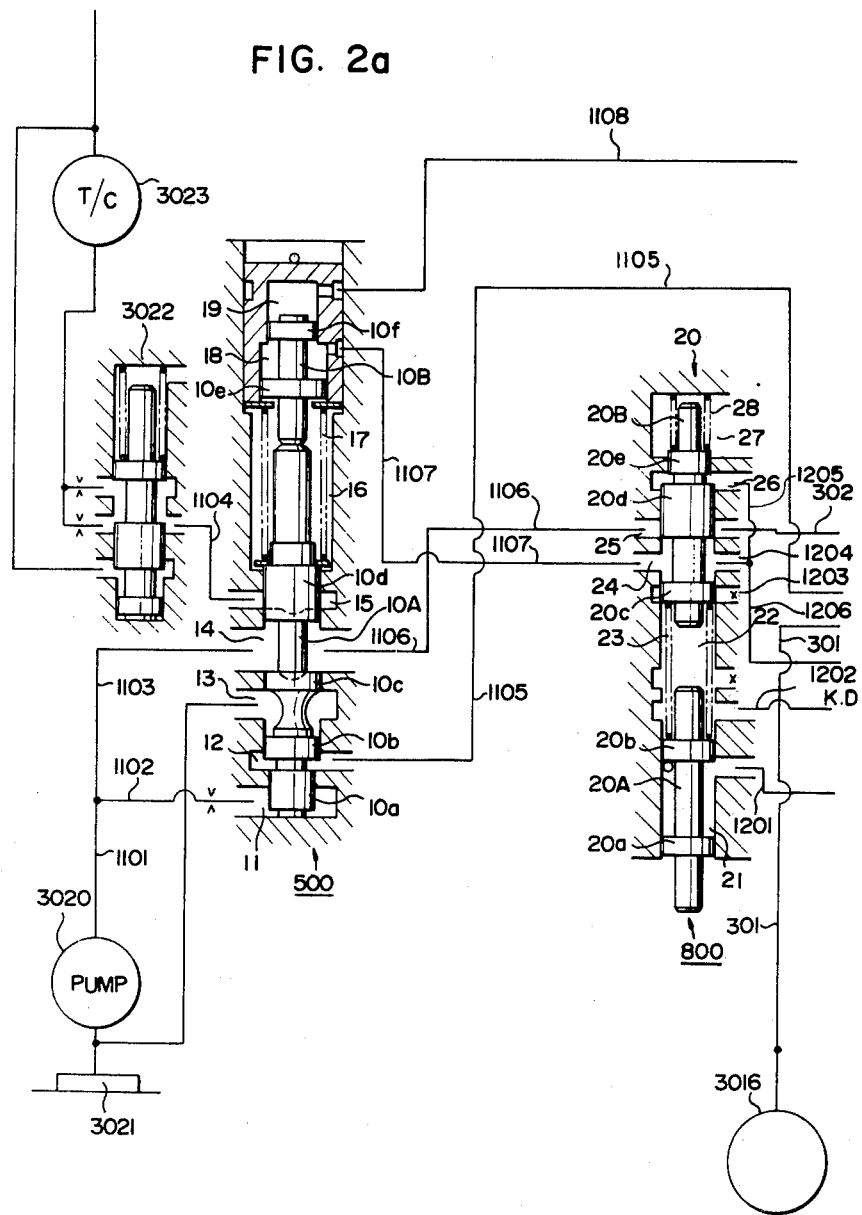
FIGS. 2a and 2c are circuit diagrams of another hydraulic control device embodying the present invention.
Figure 2B:
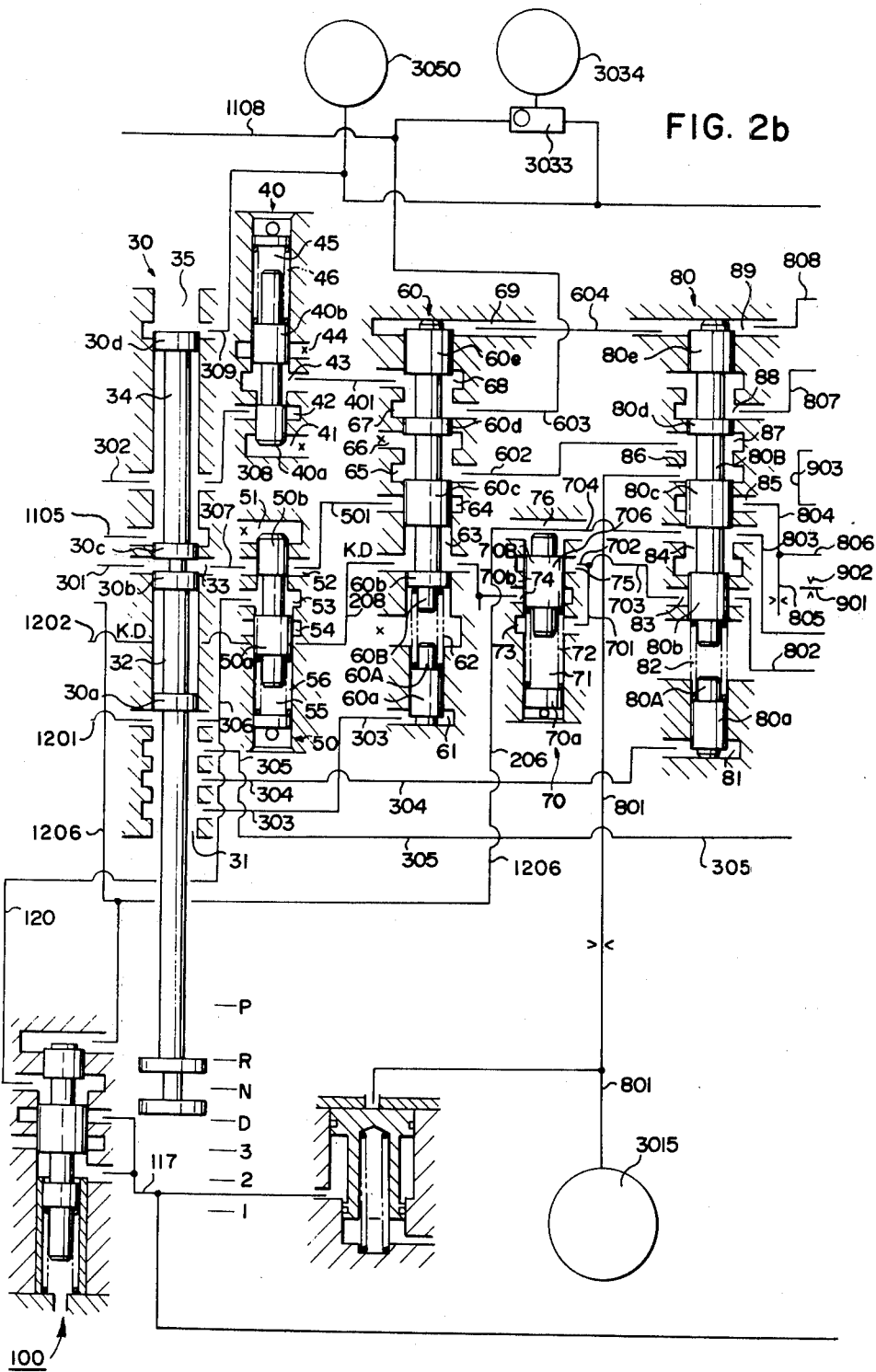
Figure 3:
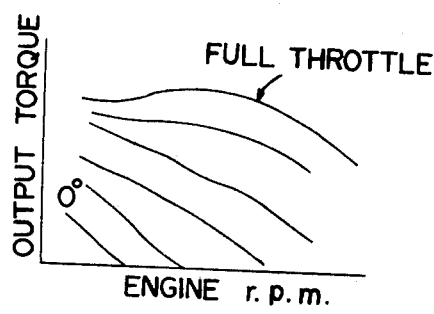
FIG. 3 is a graph showing characteristic curves illustrating the relationship among R.P.M. and output torque by various degree of throttle opening, of a gasoline engine.
Figure 4:
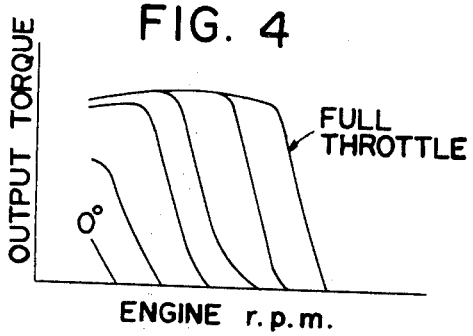
FIG. 4 is a graph showing characteristic curves illustrating the relationship among R.P.M. and output torque and in various degree of throttle opening, of a diesel engine.
Figure 6:
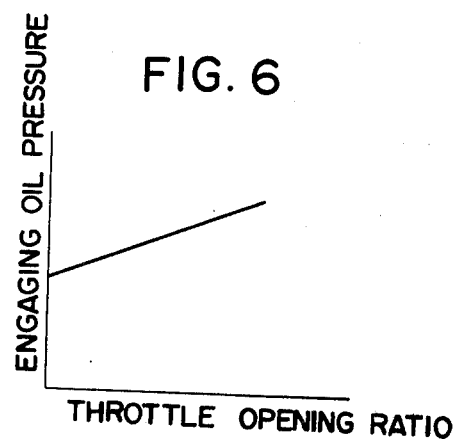
FIG. 6 is a graph illustrating the relationship between a throttle opening and an engaging oil pressure required for an automatic speed change gear device of a gasoline engine.
Figure 5:
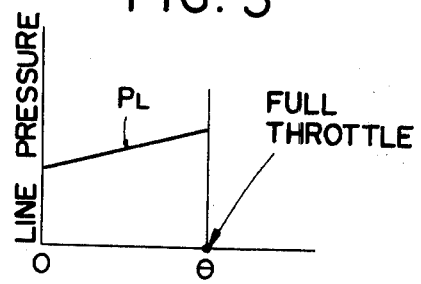
FIG. 5 is a graph showing characteristic curves illustrating the relationship between a throttle opening and a line pressure for an automatic speed change gear device.

$\rho_1 = \dfrac{\text{Number of teeth of sun gear } s1}{\text{Number of teeth of ring gear } r1}$ $\rho_2 = \dfrac{\text{Number of teeth of sun gear } s2}{\text{Number of teeth of ring gear } r2}$ $\rho_3 = \dfrac{\text{Number of teeth of sun gear } s3}{\text{Number of teeth of ring gear } r3}$ FIGS. 1a to 1c show the respective parts of the first embodiment of the hydraulic control device of an automatic speed change gear device, and thus when placed side-by-side from the left to the right, give a total view of the device. FIGS. 2a to 2c show the respective parts of the second embodiment of the hydraulic control device of an automatic speed change gear device. Thus, when FIGS. 2a, 2b, and 2c are placed side-by-side from the left to the right, give a total view of the device. Now, description will begin with the back pressure control valve which is the essential part of the present invention and then refer to the construction and function of an accumulator for preventing a shock caused due to a speed change, the accumulator receiving as a back pressure a pressure oil which has been regulated by means of the back pressure control valve. Then, description will finally refer to the outline of the hydraulic control device associated therewith.

Back pressure control valve 100

As has been described earlier, the present invention is associated with a hydraulic control device by means of a back pressure control valve for an accumulator, for a combination of a diesel engine with an automatic speed change gear device. The an automatic speed change gear device may be either of a two speed type or of a three speed type. However, an automatic speed change gear device of a four speed type is shown as an embodiment of the invention in FIGS. 1a through 1c and FIGS. 2a through 2b.

In FIG. 1b, a back pressure control valve is generally shown at 100. A piston 101 has three lands 102, 103, 104, having respective diameters $\alpha$, $\beta$, $\gamma$; the diametrical relationship thereof being $\alpha < \beta > \gamma$. Introduced into a oil chamber 105 via an oil path 113 is a throttle pressure from a throttle valve 20 (which will be described hereinafter), which acts on the head portion of the land 102 so as to depress the piston 101. A land 104 is being urged upwards under the action of a spring 110. A sleeve 114 is interposed between a valve body 115 and a land 104 of piston 101. In this respect, a valve body is first drilled from below to the same diameter as that of the land 103 and then a sleeve 114 is fitted therein for fitting on the land 104 which has a smaller diameter than that of land 103.

A port 106 is communicated via an oil path 112 with a line-pressure-regulator-valve 500 (which will be described later), with a line pressure being introduced therein all the times. A port 107 is communicated via an oil path 116 with a port 108, and then through an oil path 117 with a second brake accumulator 200, then with a third brake accumulator 300 and with a rear clutch accumulator 400, whereby the back pressure is introduced to the respective accumulators. A port 109 serves as a drain port. On the other hand, an oil chamber 118 housing a spring 110 therein is provided with an drain port 111, so that no oil pressure is developed therein.

Referring to the function of the back-pressure-control-valve, a line pressure $P_L$ is introduced between the lands 102 and 103 of the piston 101, and a throttle pressure Pth acts on the head portion of the land 102, so that the pinion 101 will be urged downwards against the action of a spring provided at its lower end. As a result, the pressure oil is introduced into a port 107 and then between the lands 103 and 104, as well. At the same time, the oil pressure urges the piston 101 upwards, so that the pressure is regulated due to the equilibrium of the two pressures acting on the piston 101, presenting a back pressure (Pb).

Assuming that the diameters of lands 102, 103 and 104 are $\alpha$, $\beta$, and $\gamma$, respectively, then $$\frac{\pi}{4} \alpha^2 Pth + \frac{\pi}{4} (\beta^2 - \alpha^2) \cdot P_L = f + \frac{\pi}{4} (\beta^2 - \gamma^2) \cdot Pb$$

, wherein $f$ is an acting force of a spring.

$$Pb = \frac{\alpha^2}{\beta^2 - \gamma^2} Pth + \frac{\beta^2 - \alpha^2}{\beta^2 - \gamma^2} P_L - \frac{f}{\frac{\pi}{4}(\beta^2 - \gamma^2)}$$

$$= \frac{\alpha^2}{\beta^2 - \gamma^2} (a\theta + b) + \frac{\beta^2 - \alpha^2}{\beta^2 - \gamma^2} (c\theta + d) - \frac{f}{\frac{\pi}{4}(\beta^2 - \gamma^2)}$$

$$= \frac{\alpha^2 a + c(\beta^2 - \alpha^2)}{\beta^2 - \gamma^2} \cdot \theta + \frac{\beta^2 d - \alpha^2(d - b)}{\beta^2 - \gamma^2} - \frac{4f}{\pi(\beta^2 - \gamma^2)}$$

Figure 7:
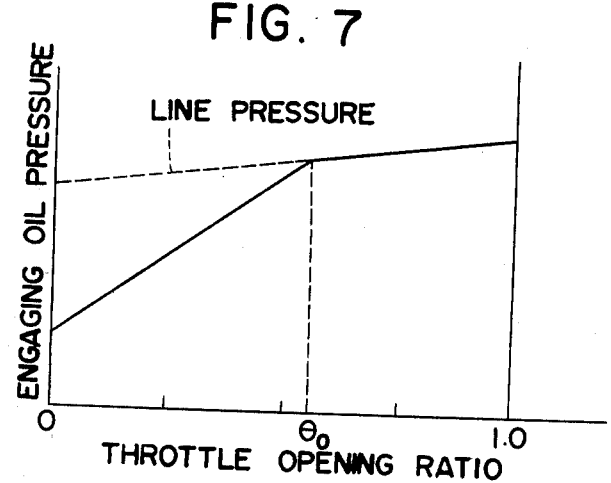
FIG. 7 is a graph showing the relationship between a throttle opening and an engaging oil pressure for an automatic speed change gear device of a diesel engine.

In this respect, by selecting the values $\alpha$, $\beta$, $\gamma$ and the magnitude of an acting force $f$ of the spring 110 suitably, then the relationship of $P_L = P_b$ may be maintained at a value $\theta$ above a certain value $\theta_0$ (with the proviso of $0 < \theta_0 < 1$). In other words, when the throttle pressure Pth exceeds a certain value given at a certain throttle opening, then a great force is imparted to the piston to thereby depress same, so that the line pressure is introduced through the port 106 and then through the port 107. As a result, the oil pressures as shown in FIG. 7 is obtained to provide the engaging pressure required.

Figure 11:
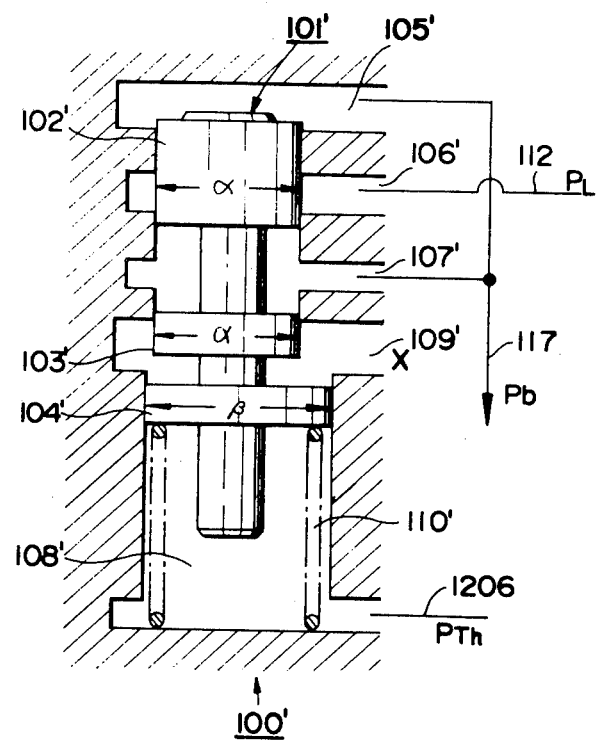
FIG. 11 is an explanatory view of a modified example for a back pressure control valve.

More specifically, when $0 \leq \theta \leq \theta_0$, $P_b < P_L$
when $\theta_0 < \theta \leq 1$, $P_b = P_L$ FIG. 11 shows an explanatory view of a modified example of a back pressure control valve according to the present invention. In this modified example, throttle pressure Pth is applied to an oil chamber 108' having spring 110' through an oil path 1206, instead of application of throttle pressure toward head portion of land 102 in said back pressure control valve 100 shown in FIG. 1b. A piston 101' has three lands, i.e. 102', 103' and 104', whereby the lands 102' and 103' have the same diameter $\alpha'$, while the land 104' has diameter $\beta'$. As shown in FIG. 11, line pressure $P_L$ is led from oil path 112 to port 106'. A head port 105' of the land 102' and a head port 107' are communicable with the second brake accumulator 200, the third brake accumulator 300 and the rear clutch accumulator 400 through oil path 117 so that the back pressure $P_b$ may be applied to these accumulators. A port 109' is provided for drainage. Balance of that valve spool is expressed in the following equations.

$$\frac{\pi}{4} \alpha'^2 \times P_b = f + \frac{\pi}{4} \beta'^2 \times P_{th}$$

$$\therefore P_b = \frac{\beta'^2}{\alpha'^2} P_{th} + \frac{4f}{\pi \alpha'^2} = \frac{\beta'^2}{\alpha'^2} (a\theta + b) + \frac{4f}{\pi \alpha'^2}$$

whereby $f$ is spring force of spring 110'. Therefore, we can make $P_L = P_b$ when the value $\theta$ is more than a certain value $\theta_0$, by selecting the values of said $\alpha'$, $\beta'$ and $f$. In other words, throttle pressure $P_{th}$ gives large force to valve spool to elevate when the throttle opening degree becomes larger than a predetermined opening degree, so that the line pressure enters into port 106' and goes out from port 107' straightly.

More specifically, when $0 \leq \theta \leq \theta_0$, $P_b < P_L$
when $\theta_0 < \theta \leq 1$, $P_b = P_L$ Accumulator devices 200, 300, 400

The oil pressure which has been regulated by means of the back pressure control valve is introduced as a back pressure to the second brake accumulator 200, third brake accumulator 300 and rear clutch accumulator 400. The respective accumulators are all different in dimension but the same in construction. Accordingly, description will be given only of the second brake accumulator 200.

A piston 201 has lands 202, 203, with a bore provided therein for housing a spring 204 therein. A bore of two-stage, cylindrical shape is provided in a transmission case 211 for accommodating the shape of the piston 201. Shown at 209, 210 are O-rings. When oil pressure is introduced via an oil path 205 into the second brake, a line pressure is introduced into a port 208. Back pressure oil is introduced from the back pressure control valve to a port 206. A drain port 212 is provided in an oil chamber 207, so the oil pressure will not be developed therein. The piston 201 is slidingly movable in the vertical direction. When the line pressure is not introduced through the port 208, the back pressure is introduced into an oil chamber 213, so that the piston 201 is urged upwards due to the above back pressure and a force of the spring 204.

Description will now be given of the acting pressure of the accumulator at the time of a speed change. Assume the initial pressure Pa1 of the accumulator which acts on the line pressure $P_L$, the final pressure Pa2 of the accumulator which acts on the line pressure $P_L$, the force $f1$ of the spring when mounted initially, the force $f2$ of the spring when compressed to its maximum, the back pressure $P_b$, the diameter $l2$ of the land 202 and the diameter $l1$ of the land 203, then $$\frac{\pi}{4} l_2^2 \cdot Pa1 = f1 + \frac{\pi}{4} (l_2^2 - l_1^2) P_b$$

Accordingly, $Pa1 = \frac{l_2^2 - l_1^2}{l_2^2} P_b + \frac{4f1}{\pi l_2^2}$

On the other hand, $\frac{\pi}{4} l_2^2 \cdot Pa2 = f2 + \frac{\pi}{4} (l_2^2 - l_1^2) P_b$ -continued $$\text{Thus, } Pa2 = \frac{l_2^2 - l_1^2}{l_2^2} P_b + \frac{4f_2}{\pi l_2^2}$$

Figure 9:
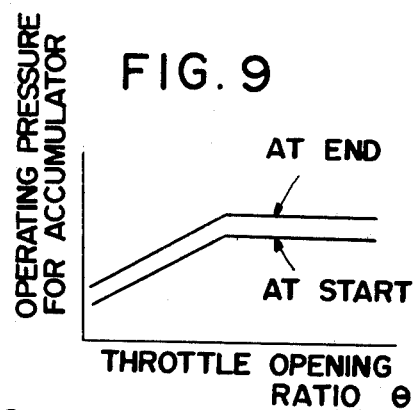
FIG. 9 is a graph showing the relationship of the throttle openings both at the start and at the end of the actions of an operating pressure for an accumulator in a hydraulic control device according to the present invention.

, wherein the acting oil pressure caused by the spring and appearing in the righthand term on the right sides of the equations with respect to Pa1 and Pa2 is fairly small, so that $P_b$, i.e., the back pressure of the accumulator, largely affects the values of Pa1 and Pa2. The value obtained by multiplying the back pressure with a given ratio of $(l_2^2-l_2^2)/l_2^2$ will be an approximate acting pressure of the accumulator. It has been proved in theory and by experiments that when the pressure of the accumulator acts at a given level lower than an oil pressure required for engaging respective clutch and brake, then the shock due to a speed change is moderated. As a result, the ideal acting pressure of the accumulator relative to the throttle opening will be as shown in FIG. 9. In short, it is most preferable for a diesel engine to use a back pressure developed by means of the back pressure control valve, for causing same to act on the accumulator.

Line pressure regulator valve 500

As shown in FIG. 1a, the line pressure regulator valve 500 regulates the pressure oil delivered from a pump 3020 to provide the line pressure $P_L$. The valve 500 includes a valve spool 10A having valve lands 10a, 10b, 10c, 10d; a valve spool 10B having valve lands 10e, 10f; a plurality of oil chambers 11, 12, 13, 14, 15, 18, 19 associated therewith.

The oil delivered by means of a pump 3020 from an oil reservoir 3021 is fed via oil paths 1101, 1102 into an oil chamber 11. The valve 500 serves to bring an oil pressure acting on the land 10a so as to reduce the pressure in equilibrium with an oil pressure acting so as to increase the pressure, and then supplies a line pressure to an oil path 1106. In this case, a force acting so as to increase the pressure may be expressed as below:

An acting force in the direction to increase the pressure
= a force of spring 17 + (land 10e − land 10f) × throttle pressure Pth + land 10f × first pressure P1.

Meanwhile, an oil chamber 13 is communicated with an oil reservoir 3021. The oil chamber 13 is used for drainage. In addition, an oil chamber 15 is communicated through an oil path 1104 with a torque convertor pressure regulator valve 3022. As is well known, the valve 3022 regulates the oil pressure of the oil used for lubrication and passing through a torque convertor 3023.

Assume the diameters $l_3$, $l_5$, $l_4$ of the lands 10a, 10e, 10f and a force $f_3$ of spring 17. The line pressure $P_L$ acts on the land 10a. Thus, the line pressure $P_L$, and the force $f_3$ of spring 17 and the force depending on the area difference between the land 10e and land 10f are expressed, when in equilibrium, as follows:

$$l_3^2 \times \frac{\pi}{4} P_L = f_3 + (l_5^2 - l_4^2) \times \frac{\pi}{4} Pth$$

$$\therefore P_L = c'Pth + d'$$

, wherein $$c' = \frac{1}{l_3^2} (l_5^2 - l_4^2), \, d' = \frac{1}{l_3^2 \frac{\pi}{4}} f_3$$

Meanwhile, as will be described under the sub-title of the throttle valve, $$Pth = \theta + b.$$

Thus, assume that $c'a + = c$, $bc' + d' = d$, then $$P_L = c\theta + d.$$

Throttle valve 20

As shown in FIG. 1a, a throttle valve 20 develops the throttle pressure Pth, i.e, the pressur in proportion to the throttle opening of a carburetor (not shown). The valve 20 includes a first valve spool 20A, valve lands 20a and 20b thereof, a second valve spool 20B and lands 20c, 20d, 20e thereof. In addition, a spring 23 placed in an oil chamber 22 urges the first valve spool 20A downwards and the second valve spool 20B upwards.

On the other hand, a spring 28 mounted in an oil chamber 27 urges the second valve spool 20B donwards. The first valve spool 20A is urged upwards, as shown, a distance in proportion to the extent that the accelerator pedal is depressed, by means of a rod (not shown) which is in cooperative relation to the accelerator pedal (not shown). The line pressure $P_L$ is introduced through an oil path 1106 into an oil chamber 25, thereby balancing a force acting in the direction of reducing the pressure with a force acting in the direction of increasing the pressure, whereby the pressure in proportion to the throttle opening, i.e., the throttle pressure $P_{th}$ is developed in the oil chamber 24. In this respect, an acting force in the direction of reducing the pressure and an acting force in the direction to increase the pressure are expressed in the following relationship:

An acting force in the direction to reduce the pressure = a force of spring 28 in oil chamber 27 + (land 20d − land 20e) × $P_{th}$ An acting force in the direction to increase pressure = a force of spring 23 (= a force to move the first valve spool 20A upwards).

An oil path 1107 in communication with the oil chamber 24 supplies the throttle pressure $P_{th}$ to an oil chamber 18 in the line pressure regulator valve 500, while an oil path 1206 supplies the throttle pressure $P_{th}$ to a throttle modulator valve 70, 2–3 shift valve 80, 2–3 shift timing valve 90, 3–3 shift valve 1000 and 3–3 shift timing valve 2000, respectively.

Meanwhile, in the case of kick-down, an oil path communicating with the oil chamber 21 is brought into communication with an oil path 1202 communicating with the oil chamber 22.

In passing, oil paths 1204, 1205, 1206 are kept in communication with each other all the times.

Now, assume the diameter $l_6$ of the land 20d, the diameter $l_7$ of the land 20e, the variations $\Delta\theta + \beta'$, $\gamma'\theta + \delta'$ between the attaching loads of springs 23 and 28 which respond to the throttle openings $\theta$ (0 to 1.0), and the maximum operational load, respectively. then, $$(l\frac{2}{6} - l\frac{2}{7})\frac{\pi P_{th}}{4} + \gamma'\theta + \delta' = \alpha'\theta + \beta'$$

Accordingly, $P_{th} = a\theta + b.$

Manual valve 30

As shown in FIG. 1b, a manual valve 30 consists of lands 30a, 30b, 30c, 30d and oil chambers 31, 32, 33, 34, 35 defined thereby. The valve 30 is manipulated at an operator's will and selects among the respective ranges, thereby distributing the line pressure $P_L$.

First Pressure Regulator Valve 40

As shown in FIG. 1B, the first pressure regulator valve 40 is provided with two spaced valve lands 40a and 40b and five oil chambers 41 to 45. The oil chambers 41 and 44 are provided for draining purposes. A spring 46 is inserted into the oil chamber 45 for urging the valve land 40b in a downward direction as seen in FIG. 2b. The valve 40 functions to reduce the line pressure $P_L$ to a predetermined constant level.

Detent Pressure Regulator Valve 50

A detent pressure regulator valve 50 has lands 50a, 50b; and oil chambers 51, 52, 53, 54, 55. The oil chambers 51 and 54 are used for drainage. A spring 56 is fitted in the oil chamber 55 to thereby urge the land 50a upwards. The valve 50 regulates the line pressure in an oil path 307 in the respective ranges d, 3, 2, 1, and supplies oil to the oil path 306.

1-2 Shift Valve 60

A 1-2 shift valve has a first valve spool 60A, a land 60a provided thereon, a second valve spool 60B and lands 60b, 60c, 60d, 60e provided thereon. Confined between a first valve 60A and a second valve 60B is a spring 62 which urges the first valve 60A downwards and the second valve 60B upwards. Pressure oil is supplied through an oil path to an oil chamber 61 only in the case of the I range. On the other hand, in the case of kick-down, a pressure oil is introduced through oil paths 1202, 208 into an oil chamber 63, applying an upward force between the lands 60c and 60b. The pressure oil which has been regulated by means of the first pressure regulator valve 40 is introduced via an oil path 401 into an oil chamber 68 in the 1-2 shift valve 60. When the governor pressure Pgo is high, the land 60e will come to the oil chambers 67, 78, thereby blocking oil path 401 and oil path 603, while bringing oil paths 501 and 602 into the mutual communication through an oil chamber 64.

Throttle modulator valve 70

A throttle modulator valve 70 consists of a plug 70a and a valve spool 70B having a land 70b. The land is urged upwards by means of a spring 72 mounted in an oil chamber 71. On the other hand, the throttle pressure $P_{th}$ is fed through an oil path 1206 into an oil chamber 76.

In the case of the "small" throttle opening, the land 70b blocks the communication of the oil path 1206 with the oil path 702, so that the throttle modulator pressure Pm will not be developed in the oil path 703 communicating with the oil path 702. When the throttle opening is increased to some extent, then land 70b is depressed and balanced with a force of the spring 72, thereby developing a throttle modulator pressure in proportion to the throttle opening. When the throttle opening approximates the fully open condition, i.e., in the kick-down condition, then a detent pressure is introduced into an oil chamber 74 which has been serving for drainage, so that the pressures in the oil chambers 74, 73 will become a detent pressure which is supplied to the oil path 703 intact. Thus, the throttle modulator pressure sharply varies. Meanwhile, the throttle modulator pressure Pm exhibits a hysteresis at the time of up-shift and down-shift.

In addition, in the condition of FIG. 1b, an oil chamber 71 is communicated via oil chamber 73 and oil path 701 with an oil path 703.

2-3 Shift valve

A 2-3 shift valve 80 has a first valve 80A, a land 80a provided thereon, a second valve 80B, and lands 80b, 80c, 80d, 80e provided thereon. A spring 82 urges the second valve 80B upwards, and the first valve 80A downwards. As shown, the lowermost oil chamber 81 is communicated via an oil path 304 with an oil chamber 31 in the manual valve 30. On the other hand, the uppermost oil chamber 89 is communicated through an oil passage 604 with an oil chamber 69 in the 1-2 shift valve 60 as well as through an oil path 808 with a governor 3030 (FIG. 1c). Thus, a governor pressure Pgo is supplied through an oil path 808 to an oil chamber 89 in the valve 80 to depress the land 80e.

In the second speed condition, the throttle pressure Pth acts in terms of the land difference (80c − 80b) in the oil chamber 84, thereby moving the second valve 80B upwards.

Conversely, in the third speed mode, the throttle modulator pressure Pm, lower than the throttle pressure Pth, acts in terms of the land difference (80c − 80b) in the oil chamber 83.

On the other hand, in the "1", "2" ranges, the detent pressure is supplied from the oil path 304 to the oil chamber 81 to thereby raise the land 80a, maintaining same on the low speed side.

On the other hand, in the condition of FIG. 1b, an oil path 801 communicating with a second brake 3015 and an oil path 205 is communicated through oil chambers 86, 87 in a 2-3 shift valve 80 with an oil path communicating with the oil chambers in the valve 60. An oil chamber 85 communicating with an oil path 804 is blocked by the land 80c. An oil path 804 is connected to two oil paths 805, 806.

2-3 Shift timing valve 90

As shown in FIG. 1c, a 2-3 shift timing valve 90 has a valve spool 90A formed with lands 90a, 90b, 90c, 90d and a valve spool 90B formed with a land 90e. A spring 92 is fitted in an oil chamber 91 for drainage which is located below in the figure. The spring 92 urges the land 90a upwards. The rear clutch pressure is fed through an oil path 915 into an oil chamber 99 located above in the figure. The 2-3 shift timing valve 90 serves to control the pressure applied to the third brake 3031 as well as the release pressure to the second brake 3015, thereby controlling a shock caused by a speed change. For instance, in case the second speed mode is shifted to the third speed mode, the line pressure applied to the third brake 3031 is introduced via oil paths 807, 908 into oil chambers 96, 97. Then, the above line pressure is applied via an orifice 905, oil path 904, orifice 907, then oil path 906 and then from oil path 914 into the third brake 3031. On the other hand, the rear clutch pressure is not supplied to an oil chamber 99, so that a valve spool 90A is biased upwards under the action of a spring 92, so that the oil paths are established via oil chambers 96, 97, oil paths 904, and 906, respectively, while the line pressure $P_L$ is introduced through orifices 905, 907 and oil path 914 to the third brake 3031, thereby bringing the third brake 3031 in engagement. At the same time, the line pressure $P_L$ is fed through an oil path 913 to an oil chamber 98 to act on the land 90d. Thus, the land 90d shifts downwards so that the communication with the oil path is blocked. As a result, the line pressure is fed to the third brake only through the orifice 905. Accordingly, the line pressure $P_L$ applied to the third brake 3031 is sharply or abruptly raised at the initial stage of the engagement, and then slowly increased after engagement.

On the other hand, the releasing operation of the second brake 3015 (FIG. 1b) brings the oil path 901 in communication with the oil path 806, with oil being drained through the oil path 805 (FIG. 1a), in case the third brake pressure is not increased considerably. On the other hand, when the third brake pressure is increased, oil is abruptly drained through the oil paths 805 and 901.

In passing, the oil path 901 is communicated with the oil chamber 94. In addition, the oil path 901 has an orifice 902. The oil chamber 93 is communicated with oil paths 803 and 904. The oil chamber 95 is communicated with an oil path 806. Furthermore, an oil path 914 is in communication with the third brake 3031 and third accumulator 300. Still furthermore, the oil path 914 is communicated via an oil path 909 with an oil path 908. The oil path 908 is communicated with an oil chamber 1008 in a 3-4 shift valve 1000 which will be described in detail hereinafter.

3-4 Shift valve 1000

As shown in FIG. 1c, a 3-4 shift valve 1000 has a plug 1000a, a valve spool 1000A, a spring 1003 confined between the plug 1000a and the spool 1000A, lands 1000b, 1000c, 1000d, 1000e provided on the spool 1000A. A governor pressure Pgo acts on the land 1000e through the oil path 1020. The spring mounted in an oil chamber 1002 for use in drainage urges the spool 1000A upwards.

In the case of the third speed mode, a condition as shown in FIG. 1c will be presented. Thus, the throttle pressure Pth in the oil path 904 acts in terms of the land difference (1000c − 1000b) in the oil chamber 1006, so the oil path 807 and oil path 908 are brought into communication with each other through the oil chambers 1008 and 1009. Oil paths 1013 and 1016 as well are communicated with each other through oil chambers 1010 and 1011. The oil pth 1013 is communicated through one way valve 3033 with the first brake 3034. (FIG. 1b)

In the case of the fourth speed mode, the throttle modulator pressure Pm through the oil path 802 acts in terms of the land difference (1000c − 1000b) in the oil chamber 1005, exhibiting a hysteresis at the time of speed change. On the other hand, the oil path 908 and oil pth 1015 are communicated with each other via oil chambers 1007 and 1008.

3-4 Shift timing valve 2000

A shift timing valve 2000 has lands 2000a, 2000b, 2000c, 2000d. A spring fitted in an oil chamber 2001 for use in drainage urges a spool 2000A upwards. The throttle pressure Pth in an oil path 1014 acts in terms of the land difference (2000b − 2000a) in the oil chamber 2003, thereby raising the spool 2000A upwards. In case the third speed mode is shifted to the fourth speed mode, the line pressure $P_L$ is applied via oil paths 1016 and 1018 to an oil chamber 2006 in the 3-4 shift timing valve 2000. In the respect, when the rear clutch pressure is low, then oil path 1018 and oil paths 2012 and 2010 are brought into communication with each other, thereby rapidly bringing the rear clutch 3035 into engagement through the oil path 915. When the rear clutch pressure acting on the land 2000d exceeds a value of { a force of spring 2002 + throttle pressure Pth × land difference (2000b − 2000a)} , then the spool 2000A will shift so as to block the path leading to the oil path 2012, so that the engagement of the rear clutch will be gradually effected.

The release of the third brake pressure is effected by drainage oil in turn through an oil path 914 communicated with a third brake 3031, oil path 912, orifice 911, check valve 910, oil path 909, oil path 908, oil chamber 1008, oil chamber 1007, oil path 1015 and finally through an oil path 2016. When the rear clutch pressure is increased, then the spool 2000A shifts so as to permit the rapid drainage through the oil paths 2016 and 2008. An oil path 2008 is communicated with an oil chamber 2005, having an orifice 2009. The oil path 2010 is provided with an orifice 2011, the oil path 2012 with orifice 2013, and the oil pth 2016 with an orifice 2007, respectively.

In case the fourth speed mode is degraded to the third speed mode, the rear clutch pressure is relieved by draining oil through oil path 915, oil path 2015, oil chamber 2014, oil path 1017, check valve 1019, oil path 1016, oil paths 1010 and 1011, oil path 1013 and the like and then finally through the manual valve 30.

Meanwhile, an oil path 915 is communicated with the rear clutch accumulator 400, as well.

Description will now be turned to the hydraulic control conditions in the respective ranges of the manual valve 30, with reference to FIG. 1b.

P-range

When the manual valve 30 is set to a P-range (parking), then the oil paths 302 and 308 are communicated, so the line pressure $P_L$ is regulated by means of the first pressure regulator valve 40. The pressure oil thus regulated is fed through an oil path 401 into an oil chamber 68 in a 1-2 shift valve 60. In the P-range, an output shaft 3040 (FIG. 8) is fixed and no governor pressure Pgo is developed, so that the 1-2 shift valve 60 is urged upwards under the action of the spring 62, presenting the condition as shown in FIG. 1b, with oil paths 401 and 603 being in communication with eac other, whereupon the pressure oil is fed to the first brake 3034, thereby bringing same in engagement. At this time, the other engaging devices are all in non-engaged condition.

R-range

When the manual valve 30 is shifted to the R (reverse) range, then the oil paths 302 and 309 are communicated with each other, and the oil paths 302 and 308 as well are brought into communication with each other. The line pressure $P_L$ is fed via an oil path 309 to a reverse brake 3050 to thereby effect the engaging operation.

On the other hand, since the oil path 309 is connected to the first brake 3034, the line pressure is applied to the first brake 3034 to thereby effect the engaging operation. At the same time, the same line pressure $P_L$ is fed through the oil path 1013 to an pil chamber 1011 in the 3-4 shift valve 1000. On the other hand, a pressure oil is fed into the oil chamber 19 on the side to increase the pressure through the oil path 1108 branched from the oil path 603. Because the governor pressure Pgo is low, the valve spool 1000A is urged upwards under the action of the spring 1003, presenting a condition as shown in FIG. 1c. Then, the oil path 1013 is brought into communication with the oil path 1016, so that the line pressure $P_L$ is applied to the oil chamber 2006 through the oil path 1018. On the other hand, since the valve spool 2000A of the 3-4 shift timing valve 2000 is pressed by means of a spring 2002, the oil chamber 2006 is in communication with an oil path 915 via oil chambers 2010, 2012, thereby bringing the rear clutch 3035 in engagement.

On the other hand, the pressure oil in the oil path 915 is supplied via an oil path 2015 in an oil chamber 2014 as well as in an oil chamber 99 in the 2-3 shift timing valve 90. The line pressure $P_L$ introduced into the oil path 309 is supplied to the first brake 3034 to thereby effect engaging action. The other clutches and brakes are all kept in nonengaging condition.

N-range

The line pressure which has been regulated by means of a line pressure regulator valve 500 is applied through oil paths 1106, 302, 308, 401, 603 only to the first brake 3034 to bring same in engagement, so that the other clutches and brakes are all in non-engaging conditions. At this time, a force of a spring 46 is balanced with the line pressure $P_L$ acting in terms of the land difference ($40b - 40a$) in the first pressure regulator valve 40, thereby regulating the pressure.

Meanwhile, the governor pressure Pgo is not developed in a 1-2 shift valve 60 in the case of the vehicle being standstill, while the spool 60B is biased upwards under the action of a spring 62 to bring an oil path 401 into communication with an oil path 603.

D-range and the first speed mode

The line pressure $P_L$ which has been regulated in the line pressure regulator valve 500 is applied via oil paths 1106, 302 and then through the manual valve 30 to the front clutch 3016 to bring same in engagement, when in the forward run. On the other hand, the line pressure $P_L$ is applied via the oil path 308 to the oil chamber 42 in the first pressure regulator valve 440. In the valve 40, a force of a spring 46 is balanced with the line pressure $P_L$ acting in terms of the land difference ($40b - 40a$), so the pressure is regulated and fed to the oil path 401. On the other hand, in the 1-2 shift valve 60, because of the first speed mode, the governor pressure Pgo in proportion to the speed of a vehicle is applied via an oil path 604 to the oil chamber 69. However, the pressure Pgo is quite low in its level, so that a valve spool 60B is raised upwards due to the force of a spring 62, so an oil path 401 is brought into communication with oil path 603 to thereby supply the line pressure $P_L$ to the first brake 3034, bringing same in engagement.

D-range and the second speed mode

The line pressure $P_L$ is applied via oil paths 302, 307, 501 to the oil chamber 64 in the 1-2 shift valve 60, with the front clutch 3016 in engagement. At the time of the second speed mode, the relatively higher speed of a vehicle will result, while a force of the governor pressure Pgo acting on a land 60e overcomes the force of spring 62. As a result, an oil path 501 is brought into communication with an oil path 602, so that the line pressure $P_L$ is supplied to a 2-3 shift valve 80. The pressure oil is supplied into the oil chamber 89 in the 2-3 shift valve 80, so that the force of the governor pressure Pgo acting on a land 80e is balanced with the sum of the forces, i.e., {a force acting in terms of the land difference ($80b - 80c$) + a force of spring 82 + a force of line pressure $P_L$ acting on land 80a (only in the cases of "2", "1" ranges)}, whereby the spool 80A is shifted a distance corresponding thereto. In the case of the second speed mode, the governor pressure is not high, so that the oil path 602 is communicated with the oil path 801, so the line pressure $P_L$ is applied to the second brake 3015 to thereby effect the engaging action. In this case, the aforesaid accumulator device 200 functions to moderate a shock due to the engagement.

On the other hand, the pressure oil in the first brake which has been in engagement at the time of the first speed mode is drained through the oil chamber 66 for drainage.

D-range and the third speed mode

The line pressure $P_L$ is applied via oil paths 501, 602, 807, 908, 914 to the third brake 3031, with the front clutch maintained in engagement to thereby bring the third brake 3031 in engagement. The pressure oil which has been acting so as to bring the second brake in engagement is drained due to the communication of the oil path 801 with the oil path 804, presenting the third speed mode.

D-range and the fourth speed mode

The governor pressure PgO is applied via an oil path 1020 to the oil chamber 1012 in the 3-4 shift valve, with the front clutch 3016 maintained in engagement, so that a force acting on the land 1000e overcomes the sum of the forces, i.e., {a force of throttle pressure Pth acting in terms of land difference ($1000c - 1000b$) + a force of spring 1003}. As a result, the spool 1000A moves downwards, so the oil path 807 is brought into communication with an oil path 1016. Thus, the line pressure brings the rear clutch into engagement through oil paths 1018 and 915. The pressure oil acting so as to bring the third clutch 3031 into engagement is drained in turn via oil path 914, orifice 911, one-way valve 910, oil path 909, oil path 908, oil path 1015, orifice 2007, oil path 2016 and the like. In pasing, since the governor pressure Pgo acting on the land 1000e of the 3-4 shift valve 1000 is increased, the oil path 908 is brought into communication with the oil path 1015 due to the downward shifting of the spool 1000A.

"3", "2", "1" ranges

In the "3" range, the autnmtic shifting may be effected among the first, second and third speed modes, although the shifting to the fourth speed mode is not possible. The respective engaging conditions are the same as in the cases of the previous D-range and the first, second and third speed modes.

The failure to shift to the fourth speed mode is due to the fact that the pressure oil which has been regulated in the detent pressure regulator valve 50 is supplied via oil paths 306, 305 into an oil chamber 1001 in the 3-4 shift valve 1000.

The cases of the "2" range and "1" range are similar to that of the "3" range. In other words, in the "2" range, the first and second speed modes are automatically shifted one to another, while in the "1" range, there remains only the first speed mode.

Kick-down

In the case of kick-down, i.e., when an accelerator pedal (not shown) is stepped to its maximum, the throttle valve 20 associated with the accelerator pedal is moved upwards against the forces of the springs 23, 28. As a result, the pressure oil is fed via oil paths 306, 1201, 1202 to the respective shift valves to cause same to function in the direction of down shift.

Description has been given of the first embodiment of the invention with reference to FIGS. 1a through 1c. As has been described earlier, the accumulator 300 is of the same construction as the accumulator 300.

The Second Embodiment

Description will now be turned to the second embodiment shown in FIGS. 2a through 2c. As shown, the construction of the second embodiment is almost the same as that of FIG. 1a–1c only differring in that the pressure oil at a constant pressure is introduced from the detent pressure regulator valve 50 via an oil path 120 into the port 106 of the back pressure control valve 100 rather than the line pressure. The constructions of the back pressure valve and accumulator are identical to those of the first embodiment.

Figure 10:
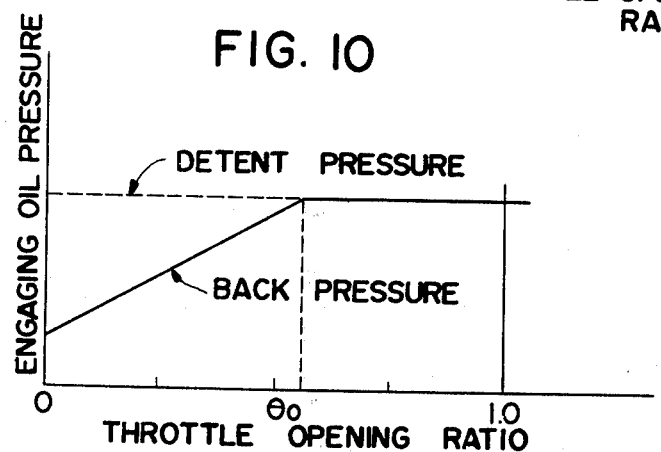
FIG. 10 is a graph showing the relationship between a throttle opening and an engaging oil pressure in a still further hydraulic control device according to the present invention.

In other words, the pressure oil at a constant pressure is fed through the detent pressure regulator valve 50 into the port 106 in the back pressure control valve 100 described in the first embodiment. Description has been given of the detent pressure reguraror valve 50 earlier. In short, the line pressure is regulated by means of the spring to thereby provide a constant pressure. The back pressure control valve is actuated due to the detent pressure as in the case with the line pressure in the first embodiment, although there is a difference in that the back pressure oil at a given pressure is developed at a throttle opening over a certain throttle opening, presenting the oil pressure characteristics as shown in FIG. 10. This presents evident differences as compared with FIG. 7 showing the oil pressure characteristics of the first embodiment.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. In an automatic transmission for a throttle-controlled engine having a torque convertor, an auxiliary speed change gear device, at least one selectively-energizable friction engagement device for effecting a speed change in the gear device, and an accumulator associated with the friction engagement device for controlling the energizing of the engagement device and or preventing shocks resulting from a speed change, a hydraulic control system for regulating the pressure of fluid supplied to the accumulator comprising:
   a source of pressurized fluid;
   a pressure regulator in fluid communication with said source to further control the pressure of fluid from said source to a line pressure;
   a throttle valve in fluid communication with said pressure regulator for developing a pressure signal indicative of the position of the throttle; and
   an accumulator pressure control valve in fluid communication with said pressure regulator and said throttle valve, and responsive to the pressure signal from said throttle valve to regulate the pressure of fluid supplied to said accumulator from said regulator, said control valve having:
   a housing provided with a first inlet coupled to said regulator, an inlet coupled to said throttle valve, a fluid outlet coupled to said accumulator, and a fluid port in communication with said outlet and said first inlet;
   a piston disposed within said housing and which requires the pressure signal from said throttle valve to move from a closed position, in which fluid communication is prevented between said first inlet and said outlet, to an open position, in which fluid communication is permitted between said first inlet and said outlet; and
   a spring disposed in said housing and in engagement with said piston for biasing said piston to said closed position,
   whereby the movement of said piston varies the degree of fluid communication between said first inlet and said outlet, such that when the pressure signal from said throttle valve is smaller than a predetermined value, pressure less than the line pressure is supplied to said accumulator, and when the pressure signal of said throttle valve is greater than a predetermined value, pressure equal to the line pressure is supplied to said accumulator.

2. A hydraulic control device for use in an automatic transmission as set forth in claim 1, wherein said piston is provided with first, second and third lands, each land having a different diameter, said throttle valve inlet being open to said first land, said first inlet being open between said first and said second lands, and said biasing spring is positioned between said third land and one end of said valve body.

3. In an automatic transmission for a throttle-controlled engine having a torque convertor, an auxiliary speed change gear device, at least one selectively-energizable friction engagement device for effecting a speed change in the gear device, and an accumulator associated with the friction engagement device for controlling the energizing of the engagement device and for preventing shocks resulting from a speed change, a hydraulic control system for regulating the pressure of fluid supplied to the accumulator comprising:
   a source of pressurized fluid;
   a pressure regulator in fluid communication with said source to further control the pressure of fluid from said source to a line pressure;
   a detent pressure regulator valve in fluid communication with said pressure regulator to provide an output fluid of constant pressure;
   a throttle valve in fluid communication with said pressure regulator for developing a pressure signal indicative of the position of the throttle; and
   an accumulator pressure control valve for receiving the constant-pressure fluid from said detent pressure regulator and in fluid communication with said throttle valve, and which responds to the pressure signal from said throttle valve to regulate the pressure of fluid supplied to said accumulator from said detent pressure regulator, said control valve having:
   a housing provided with a first inlet coupled to said detent pressure regulator, an inlet coupled to said throttle valve, a fluid outlet coupled to said accumulator, and a fluid port in communication with said outlet and said first inlet;

a piston disposed within said housing and which requires the pressure signal from said throttle valve to move from a closed position, in which fluid communication is prevented between said first inlet and said outlet, to an open position, in which fluid communication is permitted between said first inlet and said outlet; and a spring disposed in said housing and in engagement with said piston for biasing said piston to said closed position, whereby the movement of said piston varies the degree of fluid communication between said first inlet and said outlet, such that when the pressure signal from said throttle valve is smaller than a predetermined value, pressure less than the detent pressure is supplied to said accumulator, and when the pressure signal of said throttle valve is greater than a predetermined value, pressure equal to the detent regulator pressure is supplied to said accumulator.

4. A hydraulic control device for use in an automatic transmission as set forth in claim 3, wherein said piston is provided with first, second and third lands, each land having a different diameter, said throttle valve inlet being open to said first land, said first inlet being open between said first and second lands, and said biasing spring is positioned between said third land and one end of said valve body.

5. In an automatic transmission for a throttle-controlled engine having a torque convertor, an auxiliary speed change gear device, at least one selectively-energizable friction engagement device for effecting a speed change in the gear device, and an accumulator associated with the friction engagement device for controlling the energizing of the engagement device and for preventing shocks resulting from a speed change, a hydraulic control system for regulating the pressure of fluid supplied to the accumulator comprising:

a source of pressurized fluid;

a pressure regulator in fluid communication with said source to further control the pressure of fluid from said source to a line pressure;

a throttle valve in fluid communication with said pressure regulator for developing a pressure signal indicative of the position of the throttle; and an accumulator pressure control valve in fluid communication with said pressure regulator and said throttle valve, and which requires the pressure signal from said throttle valve to regulate the pressure of fluid supplied to said accumulator from said regulator, said control valve having:

a housing provided with a first inlet coupled to said regulator, an inlet coupled to said throttle valve, a fluid outlet coupled to said accumulator, and a fluid port in communication with said outlet and said first inlet;

a piston disposed within said housing and consisting of a first and a second land of the same diameter and a third land of a different diameter, said throttle valve inlet being open to said third land, said first inlet being open to said first land, and the head of said first land is in communication with fluid supplied to said accumulator; and a spring disposed within said housing between said third land and one end of said housing for biasing said piston to an open position, said piston requiring the pressure signal from said throttle valve to vary the degree of fluid communication between said first inlet and said outlet, such that when the pressure signal from said throttle valve is smaller than a predetermined value, pressure less than the line pressure is supplied to said accumulator, and when the pressure signal of said throttle valve is greater than a predetermined value, pressure equal to the line pressure is supplied to said accumulator.

6. In an automatic transmission for a throttle-controlled engine having a torque converter, an auxillary speed change gear device, at least one selectively-energizable friction engagement device for effecting a speed change in the gear device, and an accumulator associated with the friction engagement device for controlling the energizing of the engagement device and for preventing shocks resulting from a speed change, a hydraulic control system for regulating the pressure of fluid supplied to the accumulator comprising:

a source of pressurized fluid;

a pressure regulator in fluid communication with said source to further control the pressure of fluid from said source to a line pressure;

a detent pressure regulator valve in fluid communication with said pressure regulator to provide an output fluid of constant pressure;

a throttle valve in fluid communication with said pressure regulator for developing a pressure signal indicative of the position of the throttle; and an accumulator pressure control valve for receiving the constant pressure fluid from said detent pressure regulator and in fluid communication with said throttle valve, and which requires the pressure signal from said throttle valve to regulate the pressure fluid supplied to said accumulator from said detent pressure regulator, said control valve having:

a housing provided with a first inlet coupled to said detent pressure regulator, an inlet coupled to said throttle valve a fluid outlet coupled to said accumulator, and a fluid port in communication with said outlet and said first inlet;

a piston disposed within said housing and consisting of a first and a second land of the same diameter, and a third land of a different diameter, said throttle valve inlet being open to said thir land, said first inlet being open to said first land, and the head of said first land is in communication with fluid supplied to said accumulator; and a spring disposed within said housing between said third land and one end of said housing for biasing said piston to an open position, said piston requiring the pressure signal from said throttle valve to vary the degree of fluid communication between said first inlet and said outlet, such that when the pressure signal from said throttle valve is smaller than a predetermined value, pressure less than the detent pressure is supplied to said accumulator, and when the pressure signal of said throttle valve is greater than a predetermined value, pressure equal to the detent regulator pressure is supplied to said accumulator.

* * * * *

UNITED STATES PATENT AND TRADEMARK OFFICE
CERTIFICATE OF CORRECTION

PATENT NO. : 4,056,991

DATED : November 8, 1977

INVENTOR(S) : Toshimitsu Sakai; Kagenori Fukumura; Tadashi Saito

It is certified that error appears in the above-identified patent and that said Letters Patent are hereby corrected as shown below:

Column 1, line 10, "converter" should be -- convertor -- ;

line 16, after "with" insert -- a -- ;

line 18, after "gasoline" insert -- engine --;

line 26, "an" should be -- a -- ;

line 44, "aant" should be -- ant --.

Column 3, line 11, "thwn" should be -- when --.

Column 5, line 33, "this" should be -- thus --.

Column 6, line 36, "an" should be deleted.

Column 7, line 11, "an" should be -- a --;

line 18, "pinion" should be -- piston --.

Column 8, line 6, "that" should be -- the --;

line 44, "the" should be -- that --;

line 45, "acting pressure" should be -- pressure acting --;

line 46, first "of" should be -- on --;

UNITED STATES PATENT AND TRADEMARK OFFICE
CERTIFICATE OF CORRECTION

PATENT NO. : 4,056,991

DATED : November 8, 1977

INVENTOR(S) : Toshimitsu Sakai; Kagenori Fukumura; Tadashi Saito

It is certified that error appears in the above-identified patent and that said Letters Patent are hereby corrected as shown below:

Columns 8-9, in the four (4) equations spanning these columns, "$\rho_1$ ("rho subscript one")" and "$\rho_2$ ("rho subscript two")" should read -- $l_1$ ("ell subscript one")-- and -- $l_2$ ("ell subscript two") -- , respectively.

Column 10, line 3, "$P_{th} = \Theta + b.$" should be -- $P_{th} = a\Theta + b.$ -- ;

line 14, "pressur" should read -- pressure --;

line 22, "don-" should read -- down- --;

line 48, first and second "3-3" should read -- 3-4 --.

Column 11, line 36, " I " should read -- 1 --.

Column 13, line 49, "pth" should read -- path --;

line 57, "pth" should read -- path --.

Column 14, line 2, first "the" should read -- this --;

line 24, "pth" should read -- path --;

line 49, "eac" should read -- each --;

UNITED STATES PATENT AND TRADEMARK OFFICE
CERTIFICATE OF CORRECTION

PATENT NO. : 4,056,991

DATED : November 8, 1977

INVENTOR(S) : Toshimitsu Sakai; Kagenori Fukumura; Tadashi Saito

It is certified that error appears in the above–identified patent and that said Letters Patent are hereby corrected as shown below:

Column 14, line 66, "pil" should read -- oil --.

Column 15, line 45, "440" should read -- 40 -- .

Column 16, line 53, "automtic" should read -- automatic --.

Column 17, line 19, "differring" should read --differing--;

line 30, "regularor" should read --regulator--;

line 58, " or " should read -- for -- .

Column 20, line 50, "thir" should read -- third -- .

Signed and Sealed this

*Twenty-first* Day of *March 1978*

[SEAL]

*Attest:*

RUTH C. MASON
*Attesting Officer*

LUTRELLE F. PARKER
*Acting Commissioner of Patents and Trademarks*